No. 682,901. Patented Sept. 17, 1901.
W. BARBER.
VEHICLE FRAME.
(Application filed Feb. 1, 1901.)
(No Model.) 2 Sheets—Sheet 2.
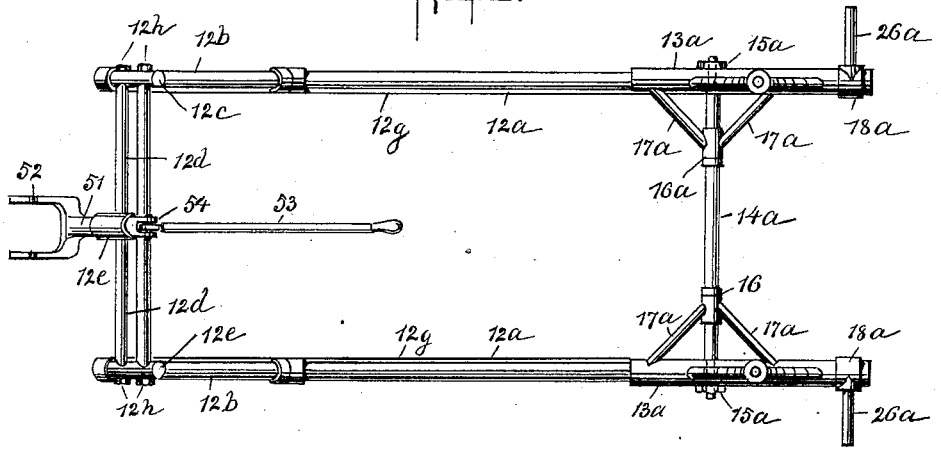
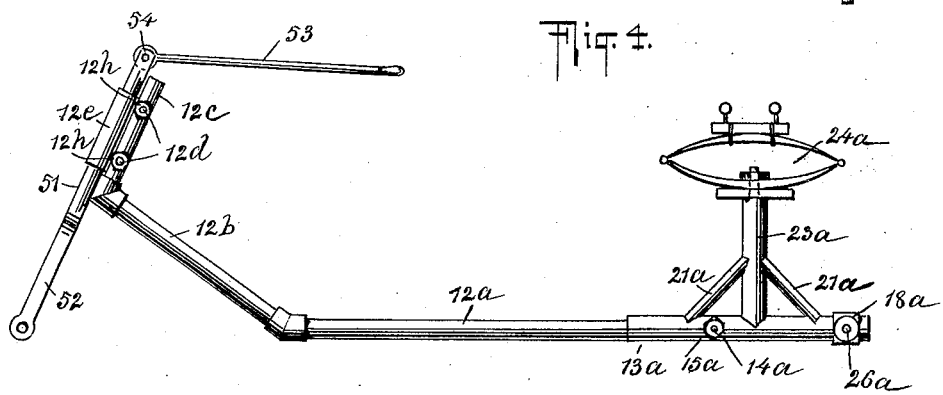
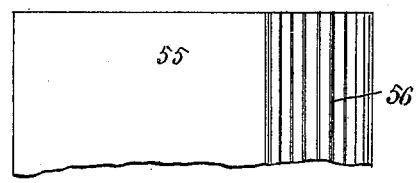
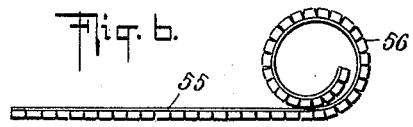
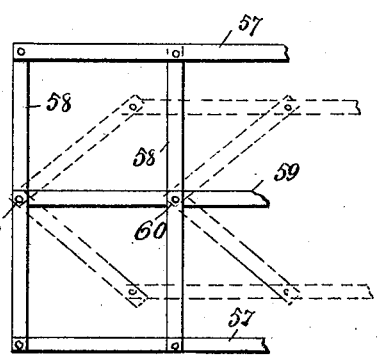
WITNESSES
F. A. Stewart
M. K. Lowell
INVENTOR
William Barber
BY
Edgar Tate
ATTORNEYS
THE NORRIS PETERS CO., PHOTO-LITHO., WASHINGTON, D. C.

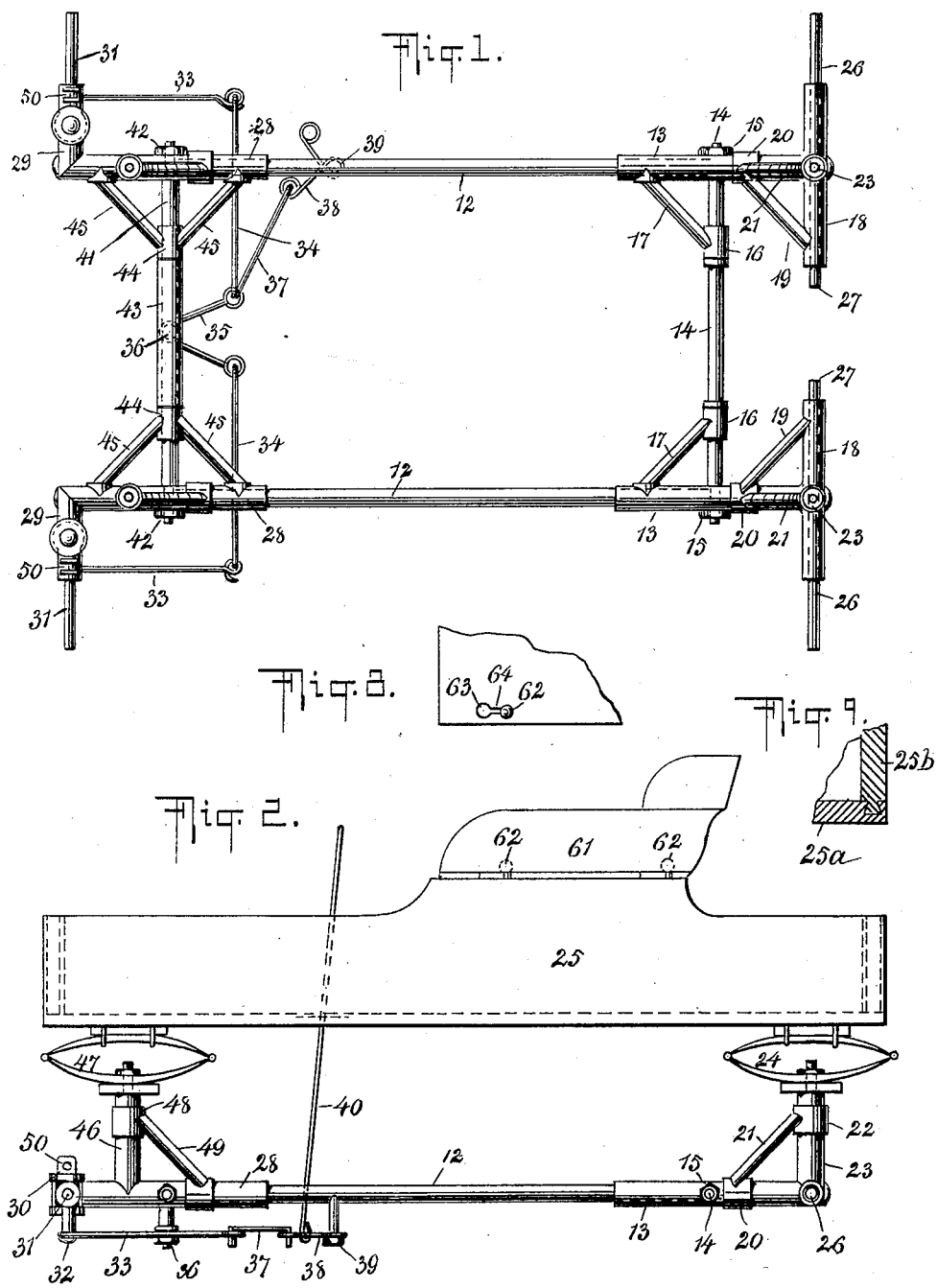

UNITED STATES PATENT OFFICE.

WILLIAM BARBER, OF BROOKLYN, NEW YORK, ASSIGNOR TO ADA S. BARBER, OF SAME PLACE.

VEHICLE-FRAME.

SPECIFICATION forming part of Letters Patent No. 682,901, dated September 17, 1901.

Application filed February 1, 1901. Serial No. 45,593. (No model.)

*To all whom it may concern:*

Be it known that I, WILLIAM BARBER, a citizen of the United States, residing at Brooklyn, in the county of Kings and State of New York, have invented certain new and useful Improvements in Vehicle-Frames, of which the following is a full and complete specification, such as will enable those skilled in the art to which it appertains to make and use the same.

This invention relates to the running-gears or frames of vehicles, and the object thereof is to provide an improved running-gear or frame for vehicles of various classes, but particularly designed for use in the manufacture of light road-vehicles, automobiles, and other vehicles of this class.

The invention is fully disclosed in the following specification, of which the accompanying drawings form a part, in which the separate parts of my improvement are designated by the same reference characters in each of the views, and in which—

Figure 1 is a plan view of one form of my improved running-gear or frame for vehicles designed particularly for use in the construction of an automobile; Fig. 2, a side view thereof, showing the bed or body in position; Fig. 3, a view similar to Fig. 1, showing a modification; Fig. 4, a side view thereof; Fig. 5, a plan view of a bottom material for the frame which I employ; Fig. 6, a similar view showing a modification thereof; Fig. 7, a view similar to Fig. 5, showing a support for the bottom material; Fig. 8, a bottom plan view of a portion of a seat which I employ, and Fig. 9 a sectional view of a detail of a vehicle-body.

In the practice of my invention, reference being made to Figs. 1 and 2, I provide a running-gear or frame for vehicles comprising two parallel side bars 12, which are preferably cylindrical and tubular in form, and the rear ends thereof are provided each with a tubular sleeve 13, and passed through said tubular sleeves 13 and through the side bars 12 is a cross-bar 14, the ends of which are provided with nuts 15, and the cross-bar 14 is provided with two collars 16, each of which is connected with the corresponding sleeve 13 by a brace 17, and said sleeves 13 and braces 17 and collars 16 may be connected in any desired manner. The sleeves 13 are also provided at their rear ends with transverse tubular heads 18, connected therewith by braces 19, and the braces 19 connect with integral collars 20 on the sleeves 13, with which are also connected upwardly and backwardly directed braces 21, which are connected with collars 22 on upwardly-directed supports 23, connected with the cross-heads 18 and the rear ends of the sleeves 13. All these parts except the braces are preferably tubular in form, and mounted on the supports 23 are springs 24, on which the rear end of the body or bed 25 of the vehicle rests.

The tubular cross-heads 18 serve as bearings for the spindles 26, on which in practice the rear wheels of the vehicles are placed, and these spindles pass through said cross heads or bearings 18 and the inner ends thereof project, as shown at 27, and form bearings for the gear-wheels of an automobile and by means of which the motor is geared in connection with the rear wheels of the vehicle. The front ends of the side bars 12 of the running-gear or frame are also provided each with a sleeve 28, each of which is provided at its front end with an outwardly-directed extension 29, which projects at right angles thereto, and the angular extensions 29 of the sleeves 28 are provided with jaws 30, in which are pivoted the spindles 31, on which in practice the front wheels of the vehicle are placed, and these spindles 31 are provided adjacent to the pivotal supports with a downwardly-directed member 31, with which is connected a backwardly-directed rod 33, and each of the rods 33 is provided at its rear end with a pivoted link 34, and the links 34 extend inwardly transversely of the frame and are connected with the backwardly-directed arms of a crank-lever 35, pivotally supported at 36, and connected with one arm of said crank-lever is a link 37, which is connected with another crank-lever 38, pivotally supported at 39 beneath one of the side bars 12, and in practice an operating-lever 40 is connected with the crank-lever 38 and adapted to be operated from the seat of the vehicle-body, so as to turn the front wheels and steer or guide the course of the vehicle. The front ends of the side bars 12 are connected by a transverse bar 41, which passes through the sleeves 28 and the said side bars 12, and is provided at its opposite ends with nuts 42, and this bar 41 is provided with a central sleeve 43, from which the lever 35 is supported, and also with collars 44, with which are connected braces 45, which are connected with the sleeves 28, as shown, and the sleeves 28 are provided with upwardly-directed members 46, on which are placed the springs 47, which support the front of the vehicle bed or body 25, and the upwardly-directed members or supports 46 are provided with collars 48, with which are connected braces 49, which are connected with the sleeves 28.

It will be understood that the front spindles 31 may be held in the position shown in Fig. 1 by the steering mechanism, of which the lever 40 forms a part, and any suitable device or devices may be provided for holding said lever rigidly for this purpose, and in Figs. 1 and 2 I have also shown the angular members 29 of the sleeves 28 as provided with vertically-arranged bearings or jaws 50, which may serve as attachments for the shaft or pole when it is desired to hitch a horse or horses to the vehicle.

In Figs. 3 and 4 I have shown a modification in which side bars $12^a$ are employed, the rear ends of which are provided with sleeves $13^a$, connected by a cross-bar $14^a$, which passes therethrough and through the side bars $12^a$ and is provided with nuts $15^a$, and the cross-bar $14^a$ is provided with collars $16^a$, having braces $17^a$, which are connected with the sleeves $13^a$, and the outer or rear ends of the sleeves $13^a$ are provided with rigid laterally-directed spindles $26^a$, secured thereto by means of collars $18^a$, and said sleeves are also provided between the collars $18^a$ and the cross-bar $14^a$ with upwardly-directed members $23^a$, on which the springs $24^a$ are placed, and said upwardly-directed members or supports $23^a$ are provided with braces $21^a$, which are also connected with the sleeves $13^a$.

The front end portions of the side bars $12^a$ in this form of construction are formed into upwardly and forwardly directed members $12^b$, at the forward ends of which are upwardly and backwardly directed members $12^c$, connected by transverse bars $12^d$, provided centrally with a tubular bearing $12^e$, through which passes the stem 51 of a yoke 52, in which in practice the front or guide wheel of the vehicle is mounted, and a backwardly-directed arm or lever 53 is connected with the upper end of the stem 51 of the yoke 52 at 54 and by means of which the vehicle may be steered or guided, as will be readily understood.

This form of construction is particularly designed for use in the construction of automobiles, but may be employed in the construction of three-wheeled vehicles of any kind or class.

In this form of construction the side bars $12^a$ and the upwardly and forwardly directed members or portions $12^b$ thereof are provided with inwardly-directed flanges $12^g$, on which in practice a bottom framework of any kind or class may be placed, and in Figs. 5, 6, and 7 I have shown constructions which may be used for this purpose.

The construction shown in Figs. 5 and 6 consists of a flexible sheet 55, to the bottom of which is secured cross-slats 56, and the flexible sheet 55 and cross-slats 56 form a mat which may be used for closing the bottom of the frame shown in Figs. 3 and 4, and this mat may be used independently of or in connection with a frame such as that shown in Fig. 7 and on which in practice it is placed, or the frame shown in Fig. 7 may be used to support any other closure device or bottom for the frame of the vehicle. The frame shown in Fig. 7 consists of horizontal side strips 57, pivotally connected by transverse strips 58 and a longitudinal central strip 59, pivotally connected with the transverse strips 58, and said transverse strips 58 are formed of two pieces which are pivotally connected at the longitudinal center of the frame, as shown at 60. When the parts of this frame are in the position shown in full lines in Fig. 7, it may be placed on the flanges $12^g$ of the side bars $12^a$, and the mat shown in Figs. 5 and 6 or any other suitable covering may be placed thereon; but the frame shown in Fig. 7 may be folded compactly together for storage or other purposes whenever desired.

The bed or body 25 shown in Fig. 2 may be of any desired construction, as may also the seat 61 thereof; but I prefer to connect the seat with the bed or body 25 by means of bayonet-joints consisting of headed pins 62, secured to the bed or body and passing through openings 63 in the bottom of the seat, said openings being provided with slots 64, adapted to receive said pins, and the bed or body proper is preferably composed of side and end pieces $25^a$ and $25^b$, connected by tongue-and-grooved joints, as shown in Fig. 9.

In either of the forms of construction herein shown and described the separate parts of the running-gear are detachable. The sleeves 13 and 28 in the form of construction shown in Figs. 1 and 2 may be detached from the side bars 12 by removing the nuts 15 and 42 from the cross rods or bars 14 and 41, and the collars 16 are removable from the cross-bar 14, as are the collars 44 from the cross-bar 41, and by means of this construction another detail hereinbefore specified—the separate parts of the running-gears in each of the forms of construction herein shown and described—may be detached and packed in compact form for storage, shipment, or other purposes.

In the form of construction shown in Figs. 3 and 4 the front cross-bars $12^d$ are provided with end nuts $12^h$, which bind the forward parts of the frame together, and the rear transverse bar $14^a$ may be removed by disconnecting the nuts $15^a$.

My invention is not limited to the exact form of the various parts and the method of connecting the same hereinbefore shown and described, as many changes therein and modifications thereof may be made without departing from the spirit of my invention or sacrificing its advantages.

Having fully described my invention, what I claim as new, and desire to secure by Letters Patent, is—

1. A vehicle-frame comprising horizontal side bars, sleeves connected with the opposite ends thereof, cross-rods passing through said sleeves and said side bars, and detachably connecting the same and wheel-supports connected with the ends of said sleeves, substantially as shown and described.

2. A vehicle-frame comprising horizontal side bars, sleeves connected with the opposite ends thereof, cross-rods passing through said sleeves and said side bars, and detachably connecting the same, and wheel-supports connected with the ends of said sleeves, said cross-rods being also provided with collars having braces connected with said sleeves, substantially as shown and described.

3. A vehicle-frame comprising horizontal side bars, sleeves connected with the opposite ends thereof, cross-rods passing through said sleeves and said side bars, and detachably connecting the same, and wheel-supports connected with the ends of said sleeves, said cross-rods being also provided with collars having braces connected with said sleeves, and the sleeves at each end of the cross-rods being provided with upwardly-directed supports for the body or bed of the vehicle, substantially as shown and described.

4. A vehicle-frame comprising horizontal side bars, sleeves connected with the ends thereof, transverse rods passing through said sleeves and said side bars, the sleeves at the rear end of the frame being provided with supports for the rear wheels of the vehicle, and the sleeves at the front end of the frame being provided with laterally-directed members to which are pivoted the spindles for the front wheels of the vehicle, substantially as shown and described.

5. A vehicle-frame comprising horizontal side bars, sleeves connected with the ends thereof, transverse rods passing through said sleeves and said side bars, the sleeves at the rear end of the frame being provided with supports for the rear wheels of the vehicle, and the sleeves at the front end of the frame being provided with laterally-directed members to which are pivoted the spindles for the front wheels of the vehicle, and steering devices in operative connection with said pivoted spindles, substantially as shown and described.

6. A vehicle-frame comprising horizontal side bars, sleeves mounted on the opposite ends thereof, cross-rods passing through said sleeves, collars mounted on said sleeves and on said cross-heads and provided with braces connected with said sleeves, wheel-supports connected with the sleeves at the rear end of the frame upwardly-directed members also connected with said sleeves and forming supports for the body of the vehicle, collars connected with the front transverse rod and provided with braces connected with the corresponding sleeves, upwardly-directed members also connected with said sleeves, and forming supports for the body of the vehicle, said sleeves being also provided with laterally-directed members, and spindles for the front wheels of the vehicle pivotally connected therewith, and means for operating said spindles so as to guide the vehicle, substantially as shown and described.

7. A vehicle-frame provided with side bars having flanges, a frame composed of pivoted members and adapted to be supported by said flanges, and a mat adapted to be placed upon said frame, substantially as shown and described.

8. A mat-supporting frame for a vehicle-frame comprising longitudinal rods and transverse rods pivotally connected, a central longitudinal rod pivotally connected with the transverse rods, said transverse rods being composed of separate sections pivotally connected at the middle thereof, substantially as shown and described.

9. A vehicle-frame, comprising horizontal side members, transverse end members detachably connected therewith, and adjustable wheel-supports connected with the horizontal side members at the opposite ends thereof, the said wheel-supports at one end being adapted to turn in a horizontal plane, and devices for turning said last-named wheel-supports, substantially as shown and described.

10. A vehicle-body provided at the sides thereof with headed pins which project upwardly therefrom, and a seat the bottom portion of which is provided with slots having enlarged portions adapted to receive said pins, substantially as shown and described.

In testimony that I claim the foregoing as my invention I have signed my name, in presence of the subscribing witnesses, this 30th day of January, 1901.

WILLIAM BARBER.

Witnesses:
F. A. STEWART,
F. TELLER.